Aug. 18, 1970　　D. R. VON RECKLINGHAUSEN　　3,525,045

APPARATUS FOR INDICATING TUNING OF FREQUENCY-MODULATED SIGNAL TRANSMISSIONS

Filed July 12, 1967

INVENTOR
DANIEL R. vonRECKLINGHAUSEN

BY Rines and Rines

ATTORNEYS

United States Patent Office 3,525,045

Patented Aug. 18, 1970

3,525,045

APPARATUS FOR INDICATING TUNING OF FREQUENCY-MODULATED SIGNAL TRANSMISSIONS

Daniel R. von Recklinghausen, Arlington, Mass., assignor to H. H. Scott, Inc., Maynard, Mass., a corporation of Massachusetts Filed July 12, 1967, Ser. No. 652,911
Int. Cl. H03j 3/14
U.S. Cl. 325—363 10 Claims

ABSTRACT OF THE DISCLOSURE

Novel apparatus is disclosed for using simple direct-current meter or similar indicators to indicate incidental amplitude modulation and off-tuning conditions in received FM signals and the like, with the aid of bridge circuits embodying transistors controlled by demodulator and peak-to-peak rectifier circuits with significant time-constants.

Figure 1:
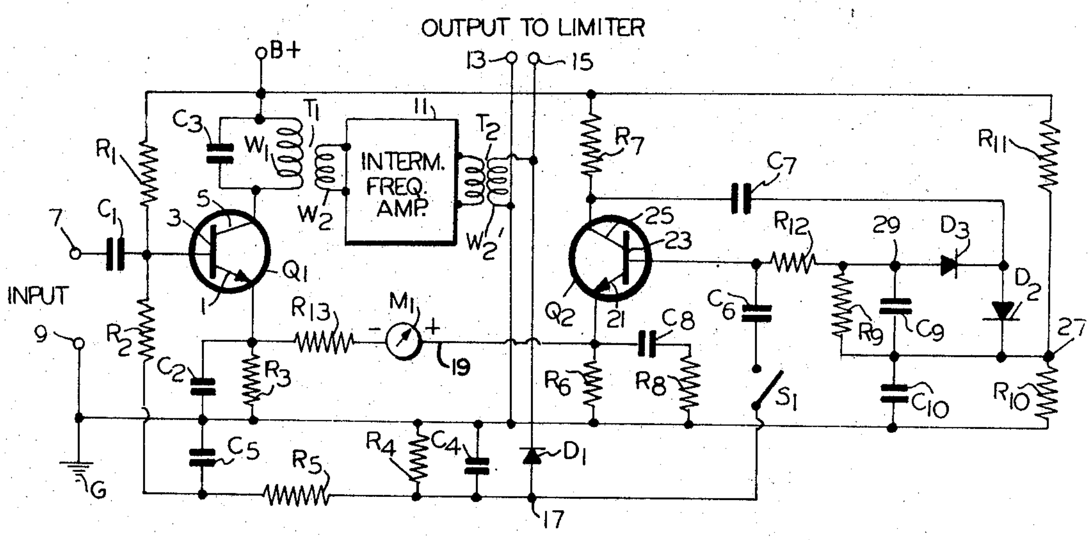

The present invention relates to apparatus for indicating tuning of frequency-modulated signal transmissions and, more particularly, to indicating the amount of incidental amplitude modulation that might create difficulties in the reception of frequency-modulated signals so as to enable more accurate tuning or antenna orientation or similar adjustments.

While the techniques of the present invention, as will later be made more evident, are suited for more general applications, the invention is particularly adapted for utilization in indicating that a receiver designed for the reception of frequency-modulated waves is tuned accurately to the desired signal and that the antenna for that receiver is properly oriented to receive the signal. Normally, a receiver for frequency-modulated waves consists of a plurality of amplifying stages, including a converter stage, all containing selective circuits to select a band of frequencies containing the transmitted signals. These amplifying stages are followed by limiter stages designed to remove the incidental amplitude modulation contained in the selected signal, and are in turn followed by a detector circuit designed to convert the frequency variations contained in the signal into an output voltage of audio and supersonic frequencies equal to those originally modulating the transmitter.

Practical receivers for frequency-modulated signals contain all the above-mentioned building blocks, all of which have certain deficiencies, although considerable ingenuity has been applied in the past to improve their performance. For example, the selective filters employed to filter out the desired band of frequencies do not have the ideal characteristic of constant attenuation for that band and infinite attenuation outside of that band, but rather have a filter characteristic which is a compromise between the above-mentioned ideal characteristics, the tolerable complexity of the filter circuit, and the phase characteristics of the filter. Similarly, the limiter stages employed in a practical receiver do not remove all amplitude variations of the input signal, but rather reduce the effective amplitude modulation percentage by a substantial factor which generally decreases for low input voltages to the limiter stages. The detector circuit for frequency-modulated signals, furthermore, will show a generally lower sensitivity for amplitude modulation than for frequency modulation.

The receiver, accordingly, will be sensitive to amplitude modulation to a reduced degree, and the amount of the ultimate detected amplitude modulation will be added to the amount of frequency modulation detected. Any amplitude modulation, even though it might have been of low distortion, will be effected non-linearly by the limiter stages and the residual amount passed by the limiters and the detector circuit will appear as distortion in the detector's output circuit. In order to minimize these distortion products, it is desirable to hold the amplitude modulation components to a minimum at the input of the limiter circuit.

Incidental amplitudes modulation of a frequency modulated signal can occur in a number of ways. One way is by "slope detection" where, by inaccurate tuning to the transmitter's frequency, the signal is placed on the attenuation slope of the selective circuits. The variation in frequency due to frequency modulation will cause a variation in amplitude and therefore amplitude modulation.

Another source of incidental amplitude modulation is the reception by the receiver's antenna of the signal from the transmitter by a multiplicity of paths. The direct signal wave from the transmitter arriving at the receiving antenna will be added vectorially to the signal arriving at the receiving antenna by way of objects reflecting the signal wave. If, for example, a single reflection is assumed and the difference in path length between direct and reflected signal is 3 km. with a signal frequency of nominally 100 mHz. (corresponding to a wave length of 3 m.), a maximum and a minimum in signal strength can occur every 100 kHz. An FM broadcasting station assigned to this frequency is customarily allowed to vary its carrier frequency over a total range of 150 kHz. Therefore, one or two maxima and minima can occur within the band assigned to that station.

Practically, more than one signal reflection can occur from hills, buildings, electrical wiring, airplanes and other vehicles, and the relative strength of these reflected signals can vary considerably. Also, the direction of arrival of the signal and any of the reflected signals is different, so that an antenna of sufficient directivity can discriminate against the unwanted reflections.

Customarily, directive antennas designed for the reception of frequency-modulated signals have been adjusted in orientation so that the average signal strength as observed on an indicating meter connected to read the limiter circuit input voltage was maximized. This maximum reading, however, only indicated that the sum of signal and reflections was a maximum rather than the presence of one desired wave. Furthermore, no indication was given which might result in the selection of a better antenna location.

In order to have an indication of the amount of amplitude modulation present at the input of the limiter circuits, previous receiver designs have relied upon a visual presentation where the detected (i.e. rectified) input voltage was applied after amplification to the deflection plates of a cathode ray tube indicator, such as an oscilloscope tube. The user of an FM receiver so equipped, or with the aid of an external oscilloscope, can, after considerable training, interpret the observed waveforms and tune the receiver and the antenna accordingly. With a cathode ray indicator of the "magic eye" type, a widening of the junction of the light and dark portion in accordance with the instantaneous amplitude modulation is the observable indication—still more difficult to interpret. All of these circuits, moreover, employ direct-current amplifiers subject to considerable drift of the indicated light pattern. The amount of amplitude modulation which can be observed, is further limited by the trace width or sharpness of the fluorescent pattern observed by eye. In addition to this, the cathode ray indicator tube requires a direct-current supply of substantially higher voltage than required for transistorized receivers, thereby necessitating a second power supply circuit.

It is to the obviating of the complexities and difficulties of such indicators of the incidental amplitude modulation that the present invention is primarily directed. In the present invention, indeed, all of these disadvantages are overcome. In summary, a direct-current meter of the type used as a normal tuning indicator can be connected to serve as a simple and effective amplitude modulation indicator and can also provide a measure of the combination of both indications.

A further object of the invention is to provide a novel tuning indicator of more general usefulness, also.

Other and further objects are hereinafter presented and are detailed in the claims.

Figure 2:
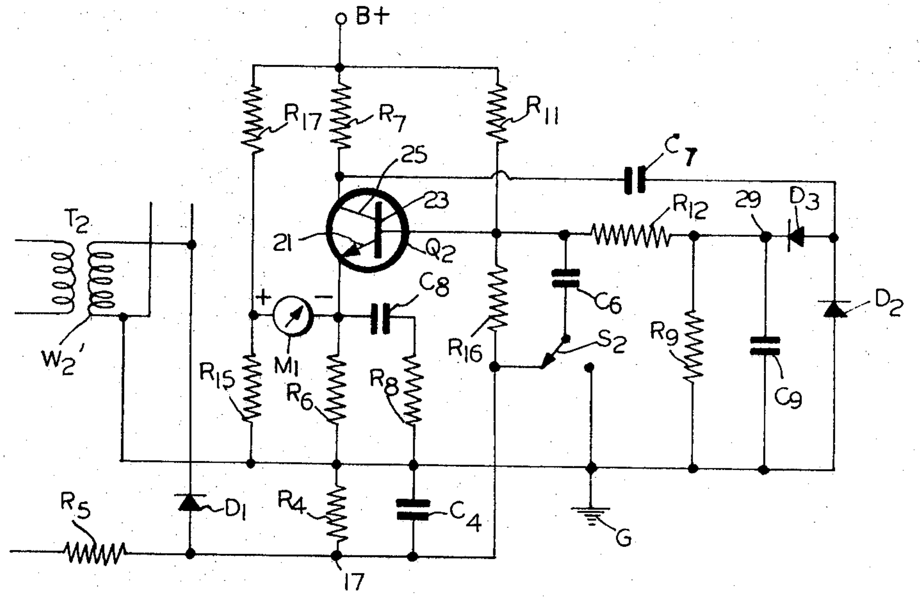

The invention will now be described in connection with the accompanying drawings, FIG. 1 of which is a schematic circuit diagram showing the invention in a preferred form, illustratively applied for use with an FM broadcast receiver; and FIG. 2 is a similar diagram of a modification.

In FIG. 1, transistor Q1 having an emitter electrode 1, base electrode 3 and collector electrode 4, is the first intermediate-frequency amplifier of such a receiver, obtaining its intermediate-frequency input signal from terminals 7 and 9, the latter of which is shown connected to ground G. Input terminal 7 is connected by way of capacitor C1 to the base electrode 3 of transistor Q1. The intermediate-frequency output signal of the transistor Q1 is obtained at collector electrode 5 in the primary W1 of transformer T1, the inductance of which is resonated with capacitor C3 to the intermediate frequency. The secondary winding W2 of transformer T1 feeds the further stages of the intermediate-frequency amplifier circuit 11, the output of which is obtained at transformer T2. The secondary winding W2′ of transformer T2 is grounded at its lower end and, at the upper end, feeds the amplified intermediate-frequency signal to the limiter circuit, so-labelled, by way of terminals 13 and 15. The same intermediate-frequency signal is also fed from the secondary winding W2′ of transformer T2 to a dode D1, the automatic gain control detector.

DC operating current for transistor Q1 is supplied from voltage source B+ by way of the primary winding W1 of transformer T1 connected to the collector electrode 5 of transistor Q1 and returned to ground G from the emitter electrode 1 through resistor R3. Resistor R3 is bypassed for the intermediate frequency to ground by means of capacitor C2.

Operating bias for transistor Q1 is also obtained from voltage source B+ and by way of resistor R1 connected to the base electrode 3 of transistor Q1. Also connected to base 1 is a resistor R2 which is in series with resistor R5 and the parallel combination of resistor R4 and diode D1. This combination, in series with the secondary winding W2′ of transformer T2, forms the grounded portion of a voltage divider, with resistor R1 being connected to the supply end. The direct voltage existing at the emitter electrode 1 of transistor Q1, therefore, is substantially lower (about 0.6 v. lower for a silicon NPN transistor) than the voltage determined at the base electrode 3 as a result of this voltage divider action. The operating current of transistor Q1 is then equal to the emitter voltage divided by the value of resistor R3. An intermediate-frequency output voltage at the secondary winding W2′ of transformer T2 will be rectified by diode D1, charging capacitor C4 and thereby developing a negative voltage at terminal 17 with respect to ground G. This negative voltage will then, by divider action between resistors R5, R2 and R1, result in a more negative voltage on the base electrode 3 of transistor Q1 with a consequently lower emitter voltage of transistor Q1 and a lower emitter current. This lowered emitter current will then decrease the gain of transistor Q1 thereby resulting in automatic gain control of transistor Q1.

The current through transistor Q1 or the voltage on resistor R3 may be measured with a direct-current instrument and can be used for an indication of relative signal level arriving at the inputs 7 and 9 of transistor Q1. It has been found preferable, however, to have this direct-current instrument indicate 0 current or 0 voltage in the absence of signal. A direct-current meter M1 is accordingly provided, connected in series with resistor R13 and connected therethrough to the emitter electrode 1 of transistor Q1 with the positive meter terminal connected to a voltage at conductor 19 substantially equal to the emitter voltage of transistor Q1 in the absence of signal. Resistor R5 and capacitor C5, connected across the parallel combination R4–C4, form a low-pass network with a time constant, typically in excess of one-tenth of a second, which effectively prevents the intermediate-frequency envelope variations at audio frequency rates from reaching the base electrode 3 of transistor Q1, and thereby also prevents them from modulating the intermediate-frequency output signal of transistor Q1. These possible audio frequency variations, furthermore, are not applied to the indicating meter M1.

In the circuit of FIG. 1, the positive terminal of meter M1 is connected to the emitter electrode 21 of a second transistor Q2, the emitter current of which is returned to ground G by way of resistor R6. The emitter current of transistor Q2 and the value of the emitter resistor R6 are chosen so that the voltage at the emitter electrode 21 is substantially equal to the emitter voltage at the emitter 1 of transistor Q1 in the absence of signal, thereby resulting in the absence of current flow through resistor R13 and meter M1, and consequently resulting in a 0 meter indication. The indicating meter M1 is thus connected in a bridge circuit, with transistors Q1 and Q2 and emitter resistors R3 and R6 forming the four arms of the bridge. Transistor Q2 is further provided with a base electrode 23 and a collector electrode 25, receiving collector current by way of resistor R7, connected to supply voltage B+. Resistor R11 and resistor R10 form a voltage divider between supply voltage B+ and ground G, and at their junction terminal 27 supply base voltage and base current to the base 23 of transistor Q2 by way of terminal 27, resistor R9 and resistor R12.

The envelope of the intermediate-frequency output signal is demodulated and detected by diode D1, charging capacitor C4 in parallel with discharging resistor R4. The value of capacitor C4 is chosen so that effectively the instantaneous negative peaks of the intermediate frequency output signal are obtained at terminal 17. The time constant of resistor R4 and capacitor C4 is chosen so that substantially the highest audio and supersonic frequencies of interest present in the envelope of the intermediate frequency output signal are preserved at the terminal 17. These audio and supersonic frequency components then travel from terminal 17 by way of a switch S1 (when closed), and a coupling capacitor C6, to the base electrode 23 of the transistor Q2. The audio and supersonic frequency components present at the base electrode 23 of transistor Q2 are then amplified by transistor Q2 and are obtained at the collector electrode 25 thereof. A network consisting of bypass capacitor C8 in series with resistor R8 is connected in parallel with emitter resistor R6. For audio and supersonic frequencies, resistor R6 and resistor R8 are effectively connected in parallel from the emitter electrode 21 to ground G, thereby producing negative feedback in the amplification of transistor Q2 and thereby serving to adjust the audio and supersonic frequency gain of Q2 to be substantially equal to or less than the ratio of the value of resistor R7 to the value of the parallel combination of resistors R6 and R8.

The audio and supersonic frequency signals present at the collector electrode 25 of transistor Q2 are coupled by way of capacitor C7 to a peak-to-peak rectifier consisting of diodes D2 and D3, charging capacitor C9 and discharging resistor R9, the peak-to-peak demodulator or rectifier circuit effectively being returned to ground G for audio and supersonic signals from common terminal 27 by way of bypass capacitor C10. A negative voltage is thereby developed at terminal 29 of the peak-to-peak rectifier with respect to terminal 27 such that a more negative voltage is applied to the base electrode 23 of transistor Q2, thereby reducing its emitter current and reducing the direct voltage present at conductor 19 with respect to ground. The presence of any audio and supersonic envelope components in the output of the intermediate-frequency amplifier will thus reduce the indication of meter M1, giving the impression of an intermediate-frequency output signal of lesser strength than would be observed when switch S1 is opened with the same average intermediate-frequency output signal present.

A first indication of amplitude modulation components present in the output signal of the intermediate-frequency amplifier 11 is thus provided by any observed reduction in indication of meter M1 as switch S1 is closed.

The time constant of the peak-to-peak envelope signal demodulator circuit can be adjusted by choosing the value of capacitors C7 and C9, and the value of resistor R9, to show a detector time constant approximately equal to the rise time of syllabic rate of speech or similar to the length of a short musical note or other intelligence transmitted—typically in the order of substantially less than one-tenth of a second. Under these conditions, the direct emitter current of transistor Q2 and the voltage across resistor R6 will not be a steady value, but will pulsate in accordance with the rate of speech and music. The mechanical time constant of a direct-current indicating meter is substantially similar to this rate and, therefore, a pulsating indication of meter M1 will be observed when the original signal is modulated with either speech or music and amplitude modulation components are present in the output of the intermediate-frequency amplifier 11.

A visual indication is, therefore, given of the relative presence of amplitude modulation components, and the necessary tuning and antenna orientation adjustments can be made by tuning for a maximum indication of meter M1 when switch S1 is closed. The absence of all amplitude modulation components can easily be observed under transmitter modulating conditions by opening and closing switch S1 and observing no change in indication of meter M1. Resistor R13 is preferably chosen so that indicating meter M1 gives substantially full-scale indication when an intermediate-frequency signal of maximum expected amplitude is fed to input terminals 7 and 9, which in turn causes minimum emitter current to flow in transistor Q1 by automatic gain control action. Similarly, resistor R8 is properly chosen so that the presence of 100% amplitude modulation will cause the meter M1 to return to near zero indication or any other desired value. Consequently, the meter indication with switch S1 closed will show an indication approximately proportional to the minimum of the envelope of the intermediate-frequency output signal and will follow that minimum as the effective amplitude modulation is varied.

The circuit of FIG. 1 thus makes use of two transistors Q1 and Q2 for the purpose of tuning indication and for amplitude modulation indication, with transistor Q1 also simultaneously serving the further purpose of intermediate-frequency amplification with automatic gain control of that amplification.

It is possible, however, to combine the two indicating functions in a single transistor circuit. This is shown in FIG. 2 wherein transistor Q2 also receives automatic gain control voltage on its base terminal 23 by way of resistor R16 from automatic-gain-control rectifier diode D1 connected to terminal 17. For purposes of tuning indication or relative signal strength indication only, the audio and supersonic components present at terminal 17 are filtered out by low-pass filter network R16 and C6 connectable to ground G by way of switch S2.

Operating bias for the base electrode 23 of transistor Q2 is supplied from supply voltage B+ by way of voltage divider resistors R11, R12, and R9 connected to ground G. If an intermediate-frequency output voltage is present at the secondary winding W2' of transformer T2, diode D1 will rectify this voltage and produce a negative voltage at terminal 17, thereby causing base electrode 23 of transistor Q2 to assume a more negative voltage, with a consequent reduction in emitter voltage of the transistor.

Indicating meter M1 has its negative terminal connected to the emitter 21 of transistor Q2 and its positive terminal connected to the junction of resistors R17 and R15 which form a voltage divider between supply voltage B+ and ground G. The values of resistors R17 and R15 are chosen so that in the absence of an output voltage of the intermediate-frequency amplifier at transformer T2 substantially zero meter indication is obtained. Here again, meter M1 is connected in a bridge circuit consisting of resistors R17, R15, R6 and transistor Q2 as the four arms. Resistors R17 and R15 are also chosen so that maximum expected intermediate-frequency output voltage causes a substantially full scale deflection of meter M1.

When switch S2 is in the position as shown in FIG. 2, the audio and supersonic frequency components present at terminal 17 are coupled into the base electrode 23 of transistor Q2 and are amplified, being then fed from collector electrode 25 by way of coupling capacitor C7 to the peak-to-peak rectifier diodes D2 and D3, now connected to produce a positive voltage at terminal 29. This positive voltage is now fed by way of resistor R12 to the base electrode 23, causing an increased emitter current and emitter voltage and a consequent decrease in current through meter M1.

All component values for the circuit of FIG. 2, unless shown above, are chosen on the same basis as those for the circuit of FIG. 1 and the circuit of FIG. 2 performs all the functions of the circuit of FIG. 1 except amplification of the intermediate-frequency with automatic gain control.

The simple circuits described above therefore perform the functions of indication of relative signal strength, indication of the relative amount of undesired amplitude modulation with indication from a single simple direct-current meter, the indications of which are readily interpreted. Receiver tuning and antenna adjustment are made using maximum steady meter indication as the indication of proper adjustment.

Although the apparatus for indicating tuning of frequency modulated signal transmission of the invention has been shown as adapted for connection to an FM broadcast tuner with transistor circuits operating in the frequency range of, for example, 88 to 108 mHz., it is not intended to restrict the application of the invention to the described purpose because much broader applications are easily accomplished. Further modifications will occur to those skilled in the art and all such are considered to fall within the spirit and scope of the invention as defined in the appended claims.

What is claimed is:

1. Apparatus for indicating the presence of amplitude-modulation components indicative of inaccurate adjustments in reception of frequency-modulated input signals and the like, comprising, means for receiving said input signals, demodulating means connected to the receiving means to detect frequency components in said signals, direct-current indicator circuit means, peak-to-peak detector means, means for selectively applying said frequency components to the peak-to-peak detector means to produce a further signal when said amplitude-modulation components are present, and means for applying the further signal to the indicator circuit means and causing said indicator circuit means to produce an indication which is different from that produced in the absence of said further signal, thereby to indicate the presence of incidental amplitude-modulation components.

2. Apparatus as claimed in claim 1 and in which may also be indicated, the peak-to-peak detector means is provided with time-constant means responsive to intelligence carried by said input signals to render the said further signal pulsating and thereby to provide a corresponding pulsating indication in the indicator circuit means.

3. Apparatus as claimed in claim 2 and in which said time constant means has a time constant of the order of substantially less than about one-tenth of a second.

4. Apparatus as claimed in claim 1 and in which the selectively applying means comprises an amplifier stage adapted selectively to be switched to the demodulating means to receive the said detected frequency components and connected to feed the peak-to-peak detector means, the latter in turn controlling the amplifier stage in accordance with its peak-to-peak detection to generate the said further signal applied to the indicator circuit means.

5. Apparatus as claimed in claim 4 and in which the indicator circuit means is a part of a bridge circuit including said amplifier stage as an arm.

6. Apparatus as claimed in claim 4 and in which said demodulating means comprises diode means connected to the receiving means and to a time-constant network.

7. Apparatus as claimed in claim 6 and in which said amplifier stage comprises a transistor provided with base, emitter and collector electrodes, the base electrode being selectively connectable to said time-constant network, said collector electrode being connected to a source of direct-current supply, and said emitter electrode being connected to an emitter load, the indicator circuit means comprising a two-terminal direct-current meter connected at one terminal between the emitter electrode and the emitter load and at the other terminal to a voltage-division network, the elements of said voltage-division network and the transistor and its emitter load serving as bridge arms.

8. Apparatus as claimed in claim 7 and in which said voltage-division network comprises a further transistor and its emitter load, the further transistor having its base electrode connected to the said receiving means, said further transistor further simultaneously serving as an input signal amplifier.

9. Apparatus as claimed in claim 7 and in which said receiving means is connected to a frequency-modulation tuner which applies to said receiving means input signals which are audio and supersonic-modulated intermediate-frequency signals.

10. Apparatus as claimed in claim 9 and in which the time-constant of said time-constant network is adjusted to that effectively the instantaneous negative peaks of said intermediate-frequency are produced.

References Cited

"Silicon Transistor I.F. Amplifier for FM Tuner," D. R. von Recklinghausen, Electronics World, pp. 32–33, 78, October 1965.

ROBERT L. GRIFFIN, Primary Examiner

A. H. HANDAL, Assistant Examiner

U.S. Cl. X.R.

325—347; 334—86